358-86. XR 3,290,432 SR
CROSS REFERENCE SEARCH ROOM

Dec. 6, 1966 K. C. QUINTON ETAL 3,290,432

WIRED BROADCASTING SYSTEMS AND APPARATUS

Filed Oct. 21, 1963 2 Sheets-Sheet 1

INVENTORS
Kenneth Charles Quinton, Daniel Henry Smart
BY
Richard Lord
Ag't

INVENTORS
Kenneth Charles Quinton, Daniel Henry Smart
BY
Richard Lund
Att'y 3,290,432

WIRED BROADCASTING SYSTEMS AND APPARATUS

Kenneth Charles Quinton, Esher, Surrey, and Daniel Henry Smart, Coulsdon, Surrey, England, assignors to Communications Patents Limited Filed Oct. 21, 1963, Ser. No. 317,595
Claims priority, application Great Britain, Oct. 22, 1962, 39,799/62
6 Claims. (Cl. 178—5.4)

Figure 1:
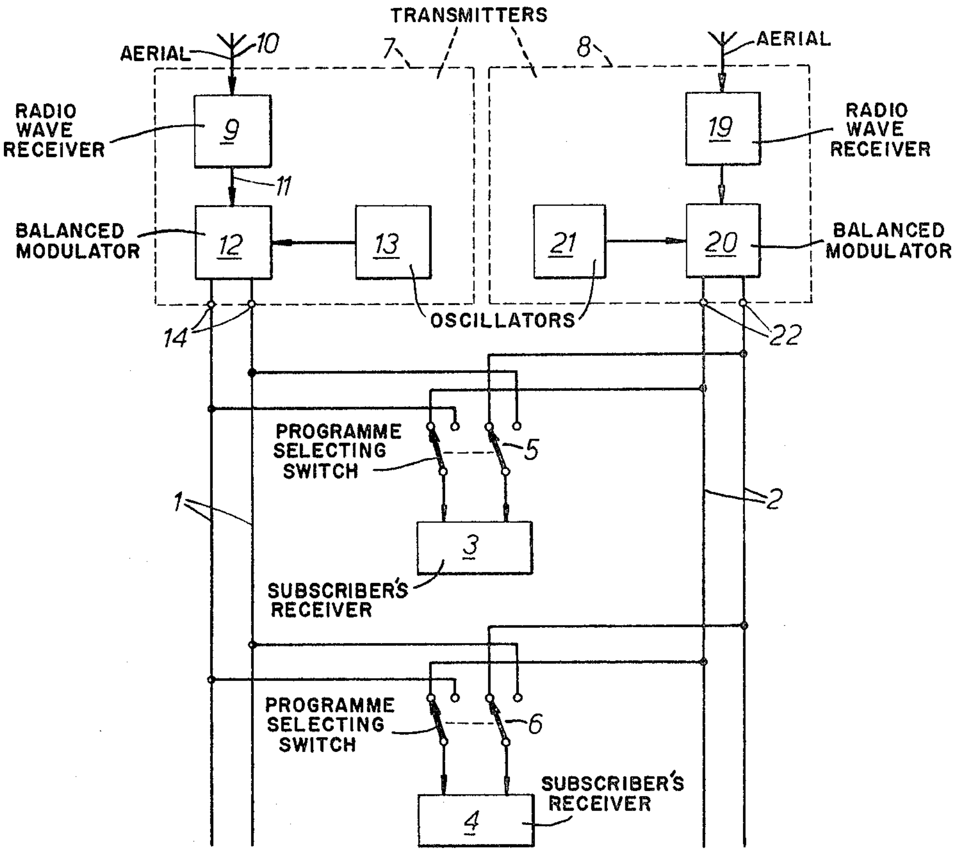

This invention relates to wired broadcasting systems and apparatus for use therein and is particularly concerned with such systems and apparatus which pertain to colour television.

An object of this invention is to enable colour television signals which are being radiated by each of two radio transmitters of a regular television service to be used for energising a respective conductive network of a wired broadcasting system in a manner which reduces patterning in the pictures which are produced with the aid of said signals being distributed by this network, in particular to reduce patterning due to the beating of carrier waves adopted for the purpose of effecting this distribution, such beating occuring due to non-linearities in the conductive network and to stray signal coupling from one conductive network to the other.

According to a first aspect of the invention there is provided a wired broadcasting system pertaining to colour television wherein, in respect of each of two colour television transmissions, a transmitting apparatus which energises a respective conductive network of the system produces and applies to said network a modulated carrier wave brightness information component and a suppressed carrier wave colour information component and the frequencies of said carrier waves differing from each other by an odd multiple of half the line scanning frequency, and means are included which determine that the frequency of the carrier wave of one brightness information component corresponds to an odd multiple of sixths of the line scanning frequency and the frequency of the carrier wave of the other brightness information component corresponds to a different odd multiple of sixths of the line scanning frequency, whereby the beating of these carrier waves or their harmonics takes the form, in a picture produced with the aid of said components, of a dot-pattern which is of reduced visibility compared to the line-pattern normally produced as a result of such beating.

According to a second aspect of the invention a colour television transmitting apparatus, for energising a conductive network of a wired broadcasting system, comprises means for producing a first electric wave at a frequency which corresponds to an odd multiple of sixths of the line scanning frequency, means for producing a second electric wave at a frequency which corresponds to a different odd multiple of sixths of the line scanning frequency, means for modulating each electric wave in accordance with brightness information signals to produce a corresponding modulated carrier wave brightness information component, means for modulating each electric wave in accordance with suppressed carrier wave signals pertaining to colour information and having a frequency corresponding to an odd multiple of half the line scanning frequency to produce a suppressed carrier wave colour information component, and means for applying the corresponding brightness and colour information components to a respective conductive network, whereby the beating of these carrier waves or their harmonics takes the form, in a picture produced with the aid of said components, of a dot-pattern which is of reduced visibility compared to the line-pattern normally produced as a result of such beating.

According to a particular aspect of the invention the frequencies of the first and second electric waves differ by at least four sixth of the line scanning frequency.

Figure 2:
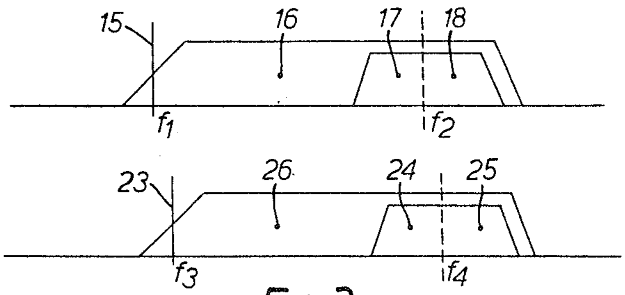
Figure 3:
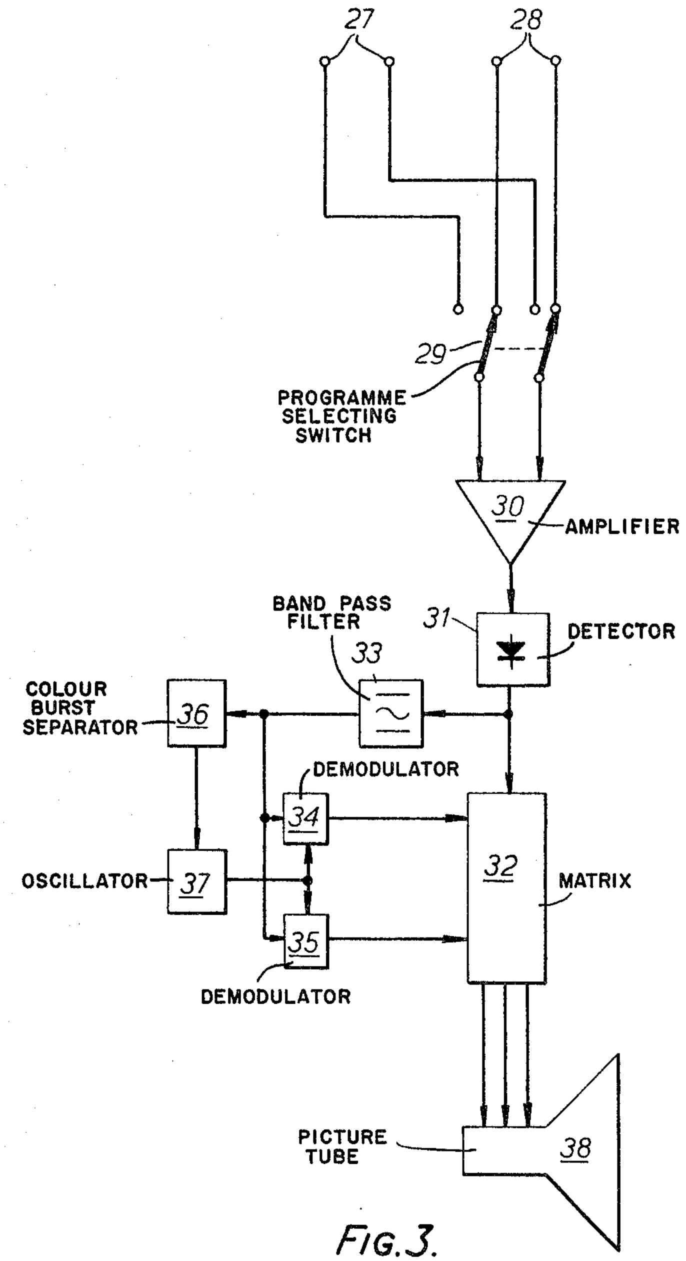

To facilitate a proper understanding of the invention it will now be described, merely by way of example, with reference to the accompanying drawings wherein:

FIG. 1 is a block diagram of a wired broadcasting system, including its transmitting and receiving apparatus, in accordance with the present invention, FIG. 2 is a diagram showing the frequency relationships of signals involved in the operation of the system shown in FIG. 1 and, FIG. 3 is a detail block schematic diagram of a receiving apparatus suitable for use in the system shown in FIG. 1.

The conductive network of the wired broadcasting system shown in FIG. 1 comprises two signal paths, 1 and 2, for example two pairs of conductors of a quad or other suitable multipair cable. Each of these paths pertains to the distribution of colour television signals in respect of different transmissions each of which is in respect of different programme material. These paths serve to distribute the television signals from a central station to a plurality of subscribers receivers, two such subscribers receivers being indicated in the drawing at 3 and 4 respectively, and each of these receivers is associated with a programme selecting switch, 5 and 6, respectively, whereby its input circuit can be connected electrically with either of the two signal paths at will in order to accept the signals of the wanted programme.

The central station equipment comprises two sets of transmitting apparatus, 7 and 8, for the purpose of energising the signal paths. The transmitting apparatus 7, in respect of the first of the two transmissions, comprises a radio wave receiving apparatus 9 which, through the intermediary of an aerial 10, is adapted to receive radio wave colour television signals of a regular television broadcasting service, it being assumed for the purpose of the following description that this service is being operated according to the 625-line N.T.S.C. system standard. This radio wave receiver 9 is arranged and adapted to extract, from the received radio signals, brightness information signals, which include colour bursts and synchronising signals, and suppressed carrier wave colour information signals. These extracted signals are applied by way of a line 11 to a balanced modulator 12. There is also applied as an input to this balanced modulator an electric wave from a highly stable carrier wave oscillator 13 which conveniently comprises an oven-controlled crystal drive so as to provide a carrier wave having a frequency which corresponds within a few cycles per second to the desired frequency.

The output from the modulator 12 is fed to terminals 14 for energising the signal path 1 of the network and this output comprises, as shown in FIG. 2, an amplitude modulated carrier wave brightness information component having a carrier wave 15 of frequency $f_1$ which corresponds to an odd multiple of sixths of the line scanning frequency P of the television signals (e.g. $2077P/6$ which is approximately 5.4 mc./s.), the modulation thereof by the said brightness information signals occupying the frequency band 16. Said output also comprises a double sideband suppressed carrier colour information component, these sidebands being indicated at 17 and 18. The frequency of this suppressed carrier wave is represented by $f_2$ (approximately 9.83 mc./s. in the present example). The difference between the frequencies $f_1$ and $f_2$ is the same as that adopted for the television line standard concerned, that is 283½P which corresponds to approximately 4.43 mc./s., which difference results in the present instance in the sidebands 17 and 18 lying within the frequency band 16. However, in some cases the difference between the frequencies $f_1$ and $f_2$ may be such that the sidebands 17 and 18 lie outside the frequency band 16 or partially therein as may be desired or convenient. In any case the frequencies $f_1$ and $f_2$ are arranged to differ by an odd multiple of half the line scanning frequency of the television line standard concerned.

The transmitting apparatus 8, pertaining to the second transmission, is similar to the transmitting apparatus 7. However, the frequencies, of the carrier waves in respect of the brightness information component and in respect of the suppressed carrier colour information component differ from those of the corresponding components applied to the signal path 1. The frequency of the carrier wave provided by the transmitting apparatus 8 in respect of the brightness information component corresponds to a different odd multiple of sixths of the line scanning frequency, the difference preferably amounting to four or a greater number of sixths. For this purpose the apparatus 8 comprises a radio receiver 19, a balanced modulator 20 and a highly stable oscillator 21, which are the equivalents of the corresponding devices 9, 12 and 13 of the apparatus 7, and provides at terminals 22, for application to the signal path 2, signals which, as shown in FIG. 2, comprise an amplitude modulated carrier wave brightness information component having a carrier wave 23, at frequency $f_3$ (e.g. $2081P/6$ which is approximately 5.4 mc./s.) and a double sideband suppressed carrier colour information component the suppressed carrier of which has a frequency $f_4$ which differs from the frequency $f_3$ by the difference adopted for the television line standard concerned, that is approximately 4.43 mc./s. The sidebands of the colour information component are indicated at 24, 25 whilst the modulation of the carrier wave 23 by the brightness information signals of this second transmission occupy the frequency band 26.

By arranging that the frequencies $f_1$ and $f_3$ correspond to different odd multiples of sixths of the line scanning frequency and do not correspond to the difference between the frequencies $f_1$ and $f_2$ or $f_3$ and $f_4$ (i.e. 4.43 mc./s. in this case) the beating between these carrier waves or their harmonics are caused to undergo phase reversals on every third picture scan and thus manifests itself as a dot-pattern interference on the received picture which is less visible to the viewer than the line pattern which would result without the employment of the present invention.

The television receiver shown in FIG. 3 comprises two pairs of input terminals 27 and 28, which are adapted to be connected to the conductors of the signal paths 1 and 2 respectively of the system shown in FIG. 1. A programme selection switch 29 (5 or 6 in FIG. 1) enables the input circuit of an amplifier 30 to be connected at will to either of the paths 1 or 2 according to which of the two transmissions it is desired to receive. The amplified signals obtained from this amplifier 30 are applied to a detector 31 which provides an output comprising the brightness and colour information signals of the transmission and this output is applied to a matrix 32 and also to a band pass filter 33, the latter passing only the colour information signals which are fed to two demodulators, 34 and 35, and to a colour burst separator 36. The latter serves to separate from the signals applied thereto synchronising signals by which the frequency and phase of a re-insertion carrier, produced by an electric wave oscillator 37, are controlled. The re-insertion carrier obtained from this oscillator 37 is fed to the demodulators 34 and 35 to effect demodulation of the two quadrature components, which components are applied to the matrix 32 to produce, from the three signals applied to it, signals appropriate for controlling a cathode ray picture tube 38.

A monochrome receiver may be connected to the system shown in FIG. 1 to receive the colour transmissions in black and white, in which case the employment of the present invention is equally effective in reducing visible patterning on the picture produced by such a receiver.

A particular advantage of the invention is the fact that the linearity requirements of any repeater amplifiers required in the signal paths between the transmitting and receiving apparatus may be less stringent in some respects than when the brightness and colour carrier frequencies are not arranged in accordance with the present invention.

It is usual practice in wired television systems to transmit the sound accompaniment of the picture as audio frequency signals over a conductive path of the network, that is to say without the use of a carrier wave, and it is deemed unnecessary to present details of this known technique in this specification.

What we claim is:

1. A colour television transmitting apparatus, for energising a conductive network of a wired broadcasting system, which comprises means for producing a first electric wave at a frequency which corresponds to an odd multiple of sixths of the line scanning frequency, means for producing a second electric wave at a frequency which corresponds to a different odd multiple of sixths of the line scanning frequency, means for modulating each electric wave in accordance with brightness information signals to produce a corresponding modulated carrier wave brightness information component, means for modulating each electric wave in accordance with suppressed carrier wave signals pertaining to colour information and having a frequency corresponding to an odd multiple of half the line scanning frequency to produce a suppressed carrier wave colour information component, and means for applying the corresponding brightness and colour information components to a respective conductive network, whereby the beating of these carrier waves or their harmonics takes the form, in a picture produced with the aid of said components, of a dot-pattern which is of reduced visibility compared to the line-pattern normally produced as a result of such beating.

2. A transmitting apparatus as claimed in claim 1, which includes, in respect of each conductive network, a radio wave receiving device arranged to derive from a received colour television transmission the brightness information signals and the suppressed carrier wave signals pertaining to colour information.

3. A transmitting apparatus as claimed in claim 2, wherein the means for producing the first and second electric waves each comprise an oscillator having an oven-controlled crystal drive and provides an electric wave at a frequency which corresponds to an odd multiple of sixths of the line scanning frequency.

4. A wired broadcasting system pertaining to colour television wherein, in respect of each of first and second colour television transmissions, a respective conductive network of the system is energised by a transmitting apparatus which includes means for producing a modulated carrier wave brightness information component and a suppressed carrier wave colour information component with the frequencies of the carrier waves differing from each other by an odd multiple of half the line scanning frequency, frequency control means controlling the frequency of the carrier wave of said modulated carrier wave brightness information component, and at least one receiving apparatus reproducing one of said first and second colour television transmissions, the frequency control means of the transmitting apparatus in respect of said first colour television transmission determining that the frequency of the carrier wave of the brightness information component of said first colour television transmission corresponds to an odd multiple of sixths of the line scanning frequency and the frequency control means of the transmitting apparatus in respect of said second colour television transmission determining that the frequency of the carrier wave of the brightness information component of said second colour television transmission corresponds to a different odd multiple of sixths of the line scanning frequency, the visible effect of the beating of these carrier waves and their harmonics thereby taking the form, in a picture produced by said receiving apparatus, of a dot-pattern which is of reduced visibility compared to the line pattern normally produced as a result of such beating.

5. A wired broadcasting system as claimed in claim 4 in which the conductive networks in respect of said first and second colour television transmissions comprise respective first and second pairs of conductors which are contained within a common cable.

6. A wire broadcasting system as claimed in claim 4 in which said receiving apparatus includes an input circuit and a switch device arranged to selectively connect said input circuit to either conductive network at will thereby to cause the receiving apparatus to reproduce a desired one of said first and second colour television transmissions.

References Cited by the Examiner

FOREIGN PATENTS 723,122 2/1955 Great Britain.

DAVID G. REDINBAUGH, *Primary Examiner.*

J. A. O'BRIEN, *Assistant Examiner.*